United States Patent
Jayawardena et al.

(10) Patent No.: US 10,336,619 B2
(45) Date of Patent: Jul. 2, 2019

(54) METHOD FOR THE SYNTHESIS OF GRAPHENE OXIDE

(71) Applicant: Sri Lanka Institute of Nanotechnology (PVT) Ltd., Walgama, Malwana (LK)

(72) Inventors: Viraj C. Jayawardena, Homagama (LK); Dilushan Rukmal Jayasundara, Homagama (LK); Gehan Amaratunga, Homagama (LK); Vimukthi Jayaweera, Homagama (LK)

(73) Assignee: Sri Lanka Institute of Nanotechnology (PVT) Ltd., Walgama (LK)

( * ) Notice: Subject to any disclaimer, the term of this patent is extended or adjusted under 35 U.S.C. 154(b) by 0 days.

(21) Appl. No.: 15/221,386

(22) Filed: Jul. 27, 2016

(65) Prior Publication Data
US 2018/0029887 A1 Feb. 1, 2018

(51) Int. Cl.
*C01B 32/198* (2017.01)

(52) U.S. Cl.
CPC .................. *C01B 32/198* (2017.08)

(58) Field of Classification Search
CPC . C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32
USPC ........................................................ 423/448
See application file for complete search history.

(56) References Cited

U.S. PATENT DOCUMENTS

| | | | |
|---|---|---|---|
| 2,798,878 A | 7/1957 | Hummers, Jr. | |
| 2011/0262341 A1* | 10/2011 | Samaranayake | B01J 19/088 423/447.2 |
| 2012/0129736 A1 | 5/2012 | Tour et al. | |
| 2013/0190449 A1 | 7/2013 | Kinloch et al. | |
| 2015/0071844 A1* | 3/2015 | Kim | H01B 1/04 423/415.1 |
| 2015/0108400 A1* | 4/2015 | Ji | B01J 19/10 252/182.32 |
| 2015/0274531 A1* | 10/2015 | Yoon | B01J 19/126 204/157.91 |

(Continued)

FOREIGN PATENT DOCUMENTS

| | | |
|---|---|---|
| CN | 105540869 A | 5/2016 |
| WO | WO 2014/168629 A1 | 10/2014 |

OTHER PUBLICATIONS

Hummers, et al., Preparation of Graphitic Oxide, J. Am. Chem. Soc. 1958; 80(6): 1339.*

(Continued)

*Primary Examiner* — Daniel C. McCracken
(74) *Attorney, Agent, or Firm* — Alston & Bird LLP

(57) ABSTRACT

Graphene oxide is synthesized by chemical treatment of graphite using only $H_2SO_4$, $KMnO_4$, $H_2O_2$ and/or $H_2O$ as reagents. Graphene oxide films obtained using the method disclosed herein were characterized using various analytical techniques. These analytical techniques confirmed the creation of single to few layer graphene oxide with relatively large lateral size distribution using the method disclosed herein.

10 Claims, 8 Drawing Sheets

(56) References Cited

U.S. PATENT DOCUMENTS

2015/0318544 A1* 11/2015 Yu ........................ C01B 17/20
                                                    429/231.8
2016/0101981 A1*  4/2016 Hong .................. C01B 31/043
                                                    423/579
2016/0130151 A1*  5/2016 Kurungot .......... C01B 31/0438
                                                    502/180

OTHER PUBLICATIONS

Brodie, B.C., On the atomic weight of graphite, Phil. Trans. R. Soc. Lond. 1859, 149: 249-259.
Chen, J., Bowen, Y., Chun, L. et al, An improved Hummers method for eco-friendly synthesis of graphene oxide in Carbon, 2013, 64: 225-229.
International Search Report and Written Opinion from International Patent Application No. PCT/IB2017/054540, dated Nov. 16, 2017, 10 pages.
Kadam, Mahesh M. et al.; "Synthesis and fabrication of graphene oxide thin film"; AIP Conference Proceedings, 2013, vol. 1538, No. 1, pp. 249-252.
Staudenmaier, L., Verfahren zur Darstellung der Graphitsäure, in Berichte der deutschen chemischen Gesellschaft. 1898, 31(2): 1481-1487.
International Preliminary Report on Patentability for International Application No. PCT/IB2017/054540 dated Oct. 30, 2018.

* cited by examiner

METHOD FOR THE SYNTHESIS OF GRAPHENE OXIDE

FIELD

This invention relates to the chemical synthesis of graphene oxide. Specifically, as compared to prior art methods, the invention disclosed herein provides a simple, cost-effective method of providing relatively large and high quality graphene oxide materials while preventing the creation of toxic gasses and avoiding the use of $H_3PO_4$.

BACKGROUND

Fundamentally, graphene consists of a single layer of graphite (i.e., $sp^2$ hybridized carbon atoms). Graphene is approximately two hundred times stronger than steel, nearly one million times thinner than a human hair, and more conductive than copper. With such unique and beneficial physical properties, graphene, and in particular, high quality graphene, is desirable for use in various industries. For example, obtaining high quality graphene is of significant importance for electronic and photonic based applications. Currently, chemical vapor deposition method is the preferred route of manufacturing high quality graphene for these applications. Chemical vapor deposition, however, is expensive and cannot currently produce the quantities of graphene demanded for large-scale industrial applications at a reasonable cost.

Because of its unique and beneficial properties, significant research and development work has recently been undertaken to cost-effectively produce high quality graphene on a commercial scale. One such method considered that is capable of producing large quantities of graphene is chemical reduction of graphene oxide. The graphene created through reduction of graphene oxide has traditionally been of an inferior quality as compared with graphene produced through chemical vapor deposition due to defects (discussed below) that are created during the manufacturing process. Graphene produced through reduction of graphene oxide is currently used in developing new technologically advanced materials specifically in the areas of nanocomposites, functional coatings, paints and electrode materials for chemical and biological sensing and energy storage devices.

One of the most common methods of creating graphene oxide is through the chemical exfoliation of graphite (e.g., bulk graphite), which consists of a large number of graphene sheets held together by Van der Waals forces. One source of excellent, high quality pure bulk graphite is Sri Lankan vein graphite. Sri Lanka has a longstanding reputation for its high quality crystalline vein graphite with purity levels ranging from 80-99% carbon. Sri Lankan vein graphite is mined as lumps and is considered to have a high degree of crystalline perfection, excellent electrical and thermal conductivities, and superior cohesive energy as compared to other natural graphite materials.

In a traditional chemical exfoliation method, graphite is treated with a strong oxidizing agent to produce graphene oxide. One of the earliest recorded methods of synthesis of graphene oxide was by Brodie (1859). Brodie demonstrated the synthesis of graphene oxide by adding a portion of potassium chlorate to a slurry of graphite in fuming nitric acid. Subsequent studies by Staudenmaier (1898) improved upon Brodie's method by using concentrated sulfuric acid as well as fuming nitric acid and adding the potassium chlorate in multiple aliquots over the course of the reaction. Staudenmaier's alteration of Brodie's method helped the production of a highly oxidized graphene oxide in a single reaction vessel significantly more practical. Hummers (1958) further improved upon this method (see Hummers et al, 1958, herein "Hummer"). In Hummers's method, which is commonly used today, graphite is oxidized by treatment with $KMnO_4$ and $NaNO_3$ in concentrated $H_2SO_4$.

These traditional methods of producing graphene oxide are not devoid of flaws. While each of Brodie's, Staudenmaier's, and Hummers's methods can be used to create graphene oxide, each results in a graphene oxide structure that is less than ideal for the creation of high quality graphene through reduction on a commercial scale. More specifically, each of these methods results in significant defects in the graphene oxide chemical structure, defects which are not readily repairable during a subsequent reduction of graphene oxide to graphene. For example, defects can form in Hummers's method because oxidation of graphite with $KMnO_4$ results in the formation of manganate ester which will create a vicinal diol. If left unprotected, the vicinal diol may be oxidized to diketone, which leads to the formation of holes in the graphene basal plane. Such chemical defects in the resulting chemically converted graphene diminish the highly sought after electrical and mechanical properties as compared with pristine, high quality graphene. Further, each of these prior art methods involves the generation of one or more toxic gases, such as $NO_2$, $N_2O_4$, and/or $ClO_2$.

Recently an improved version of Hummers's method was disclosed by James Tour's group at Rice University (see US 2012/0129736 A1, herein "Tour"). This improved method excludes $NaNO_3$, requires a higher amount of $KMnO_4$ and $H_2SO_4$, and also performs the reaction in a 9:1 mixture of $H_2SO_4/H_3PO_4$. According to Tour, this method does not generate toxic gasses and prevents excessive oxidation and defect (i.e., hole) formation in the resulting graphene oxide. Also according to Tour, it is the addition of $H_3PO_4$ that helps to prevent defect formation, which can be caused by excessive oxidation in the graphene oxide structure. More recently Chen and co-workers (see Chen et al, "2013", herein "Chen") introduce a method without using $H_3PO_4$, but the oxidation method gives lower oxidation than the Tour's.

The use of $H_3PO_4$, however, is undesirable due to its cost and the increased complexity of the reaction method. Moreover, $KMnO_4$ is one of the strongest oxidants, especially in acidic media. Complete intercalation of graphite with concentrated $H_2SO_4$ can be achieved with the assistance of $KMnO_4$ by forming graphite bisulfate (see Sorokina et al, 2005). Accordingly, the formation of graphite bisulfate gives reaction stability, so the role of $NaNO_3$ and/or $H_3PO_4$ is unnecessary for the synthesis of graphene oxide (herein "GO") using Hummers method. Accordingly, it would be beneficial to create a commercially viable method of creating high quality, highly oxidized graphene oxide (i.e., graphene oxide with fewer defects) from bulk graphite without the creation of toxic gasses or other toxic byproducts or the use of $H_3PO_4$.

SUMMARY

Disclosed herein is a novel approach to the chemical synthesis of graphene oxide from graphite using only $H_2SO_4$, $KMnO_4$ and $H_2O_2$ and/or $H_2O$ as reagents for the synthesis. The method disclosed herein is scalable, cheaper, and safer than prior art methods. The chemically exfoliated graphene oxide created by the method disclosed herein has high solubility in both aqueous and polar organic solvents and can be casted into thin membranes as well as exfoliated into single to few layer graphene oxide structures with relatively large lateral dimensions as compared to structures created by prior art methods.

More specifically, this application discloses a modified chemical oxidation method that synthesizes graphene oxide from graphite using only of $H_2SO_4$, $KMnO_4$ and quenching with $H_2O_2$ and/or $H_2O$ or ice. The method of the present invention uses no $H_3PO_4$, the central protecting reagent used in the method disclosed in Tour. It was surprisingly and unexpectedly discovered that, in the correct proportions, $H_2SO_4$, $KMnO_4$, $H_2O_2$, and/or $H_2O$ alone could be used as reagents without $H_3PO_4$ to create high quality graphene oxide from graphite. Before Applicants' invention it was believed that the use of $H_3PO_4$ was essential in the creation of high quality graphene oxide from graphite in a toxic-fume free method.

Generally, in embodiments of the present invention, graphite is placed into a vessel where $H_2SO_4$ is added. $KMnO_4$ is added to this $H_2SO_4$/graphite mixture, while stirring. The stirring is then continued for several hours and the reaction is quenched with ice, $H_2O$, and/or ice and $H_2O_2$. The supernatant is then discarded, leaving a graphene oxide slurry. The remains are then washed several times starting with deionized water followed by a 1:2 water:HCl mixture to remove $Mn^{2+}$ ions and other impurities. Washing is then carried out one last time with ethanol and diethylether in order to obtain graphene oxide powder. The brown color solid material obtained after this step is then dried at room temperature under vacuum. The pilot scale process is also performed in this embodiment, in order to understand scalability of the reaction.

Alternatively, the graphene oxide slurry can be exfoliated by adding a portion of the graphene oxide slurry dropwise to an aqueous solution and then ultra-sonicating the aqueous solution/graphene oxide slurry. The ultra-sonicated mixture can be transferred to an appropriate substrate if desired. Once the graphene oxide has been dispersed in an aqueous solution, it yields monomolecular or substantially monomolecular sheets of graphene oxide. These sheets can then be reduced to obtain reduced graphene oxide, the graphene form.

DETAILED DESCRIPTION

Figure 1:
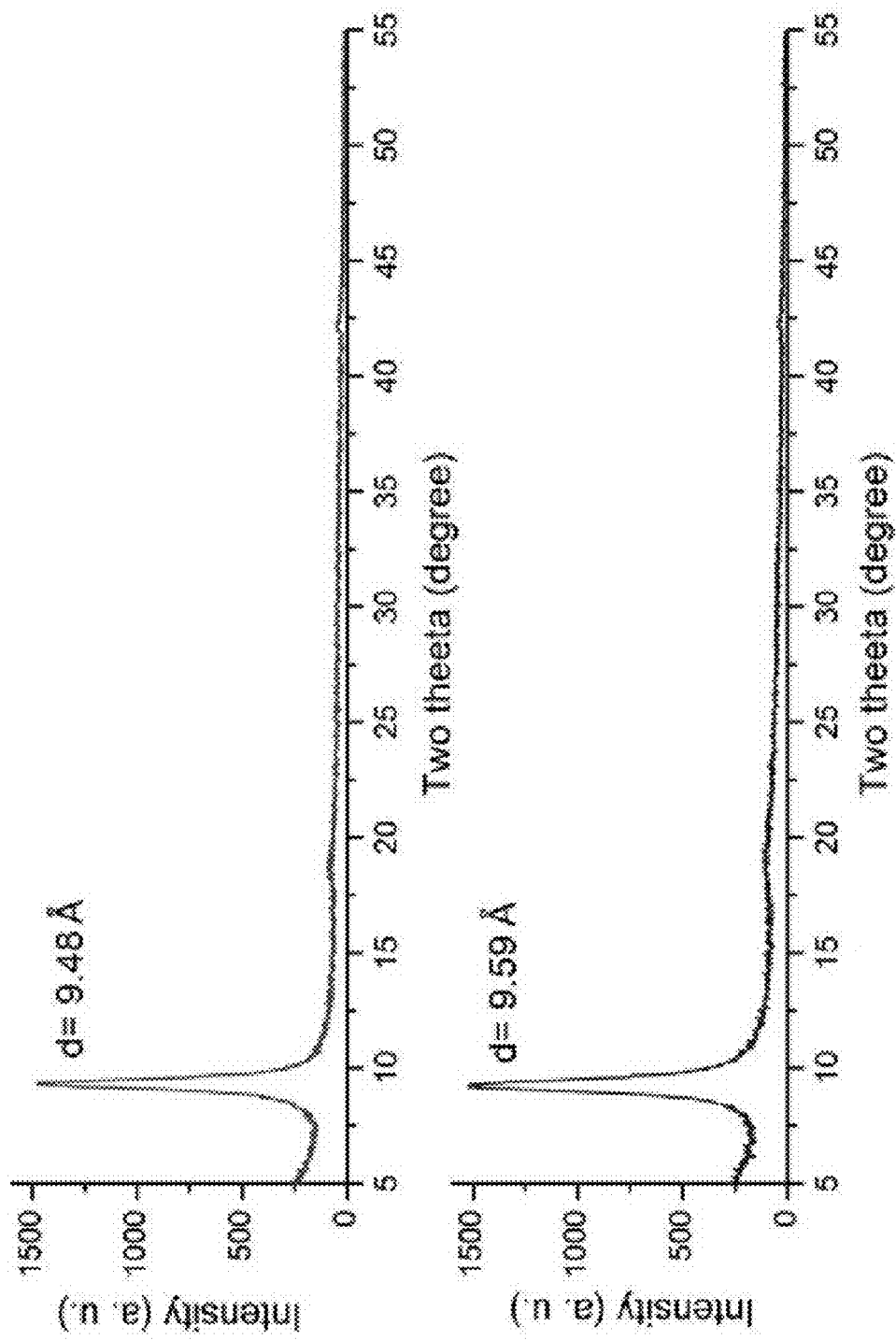
FIG. 1 is an X-ray Diffraction pattern obtained for a graphene oxide powder according to an example embodiment of the present invention

The following description provides detailed embodiments of various implementations of the invention described herein. After reading this description, it will become apparent to one skilled in the art how to implement the invention in various alternative embodiments and alternative applications. However, although various embodiments of the present invention will be described herein, it is understood that these embodiments are presented by way of example only, and not limitation. As such, the detailed description of various alternative embodiments should not be construed to limit the scope or the breadth of the invention.

In an embodiment, approximately 1.5 g of natural high purity (>99%) vein graphite obtained from Bogala Graphite (GK) (Sri Lanka) was added to 100 ml of 0° C. $H_2SO_4$ (95-97%, Sigma-Aldrich, analytical grade). During this addition, the mixture was maintained at 0-10° C. and stirred. While stirring the mixture, about 5.4 g of $KMnO_4$ (99%, Lions Lab Chemicals, India, LR grade) was added at a reasonable rate (i.e., 2 g $min^{-1}$). The temperature of the mixture was maintained at about 0-10° C. At this point, the reaction mixture appeared green in color. After adding the $KMnO_4$ the mixture was stirred for 12 hours at 0-10° C. and the colour of the mixture turned to dark brown. After stirring for 12 hours, the reaction mixture was quenched with a mixture of about 200 g of ice, 200 ml of $H_2O$, and 1.5 ml of $H_2O_2$. At this step colour of the reaction mixture turned into yellow.

The supernatant was then carefully discarded leaving graphene oxide slurry. Next, the remaining graphene oxide slurry was washed with 400 ml of deionized water and then was washed with a 1:2 aqueous HCl solution. After that, to obtain graphene oxide powder, the remaining slurry was washed with 400 ml of ethanol and 400 ml of ether. The brown colour solid material obtained was dried at room temperature under vacuum.

In order to understand scalability of the reaction, a pilot scale process is also performed by using approximately 100 g of natural high purity (>99%) vein graphite with the same process. In an embodiment, the reaction time is increased up to 20 hours.

Alternatively, the graphene oxide slurries were then exfoliated by adding about 5 mg of the viscous graphene oxide slurries dropwise into about 200 ml of deionized water. These slurry/water mixtures were then placed into an ultra-sonication device (Grant, USA, 120 W, 150 Hz) for 20 minutes. The ultra-sonicated, graphene oxide slurry/water mixtures were then transferred dropwise onto a freshly cleaved mica sheet to obtain Atomic Force Microscopy image.

Graphene Oxide Membrane Characterization

X-ray Diffraction, Thermo-gravimetric Analysis, Fourier Transform Infrared Spectroscopy, Nuclear Magnetic Resonance Spectroscopy, Raman Spectroscopy, Atomic Force Microscopy and Transmission Electron Microscopy measurements on the graphene oxide membranes produced in an embodiment confirm the structural and chemical changes that have taken place due to the oxidation process.

X-Ray Diffraction Characterization

X-Ray Diffractometric ("XRD") data were measured on a D8-Bruker AXS Diffractometer equipped with MBraun PSD position sensitive detector and the X-axis was restricted within a range (of 2θ) from 5° to 55°. FIG. 1 at (a) shows a representative XRD spectrum obtained from graphene oxide created according to an embodiment method of the present invention. FIG. 1 at (a) shows an interlayer spacing of 9.48±0.12 Å. The XRD interlayer spacing is proportional to the degree of oxidation. This in turn is related to the facility to exfoliate the GO into monolayer sheets, which on reduction can lead to monolayer graphene. It should be noted that the interlayer spacing reported here is similar to the spacing reported through the use of the method disclosed in Tour. However, FIG. 1 at (b) illustrate XRD spectrum obtained from graphene oxide from pilot scale process, with an interlayer spacing of 9.59±0.12 Å confirming an extremely high degree of oxidation. A value that is this high has never been reported in the literature to date.

Thermogravimetric Analysis

Figure 2:
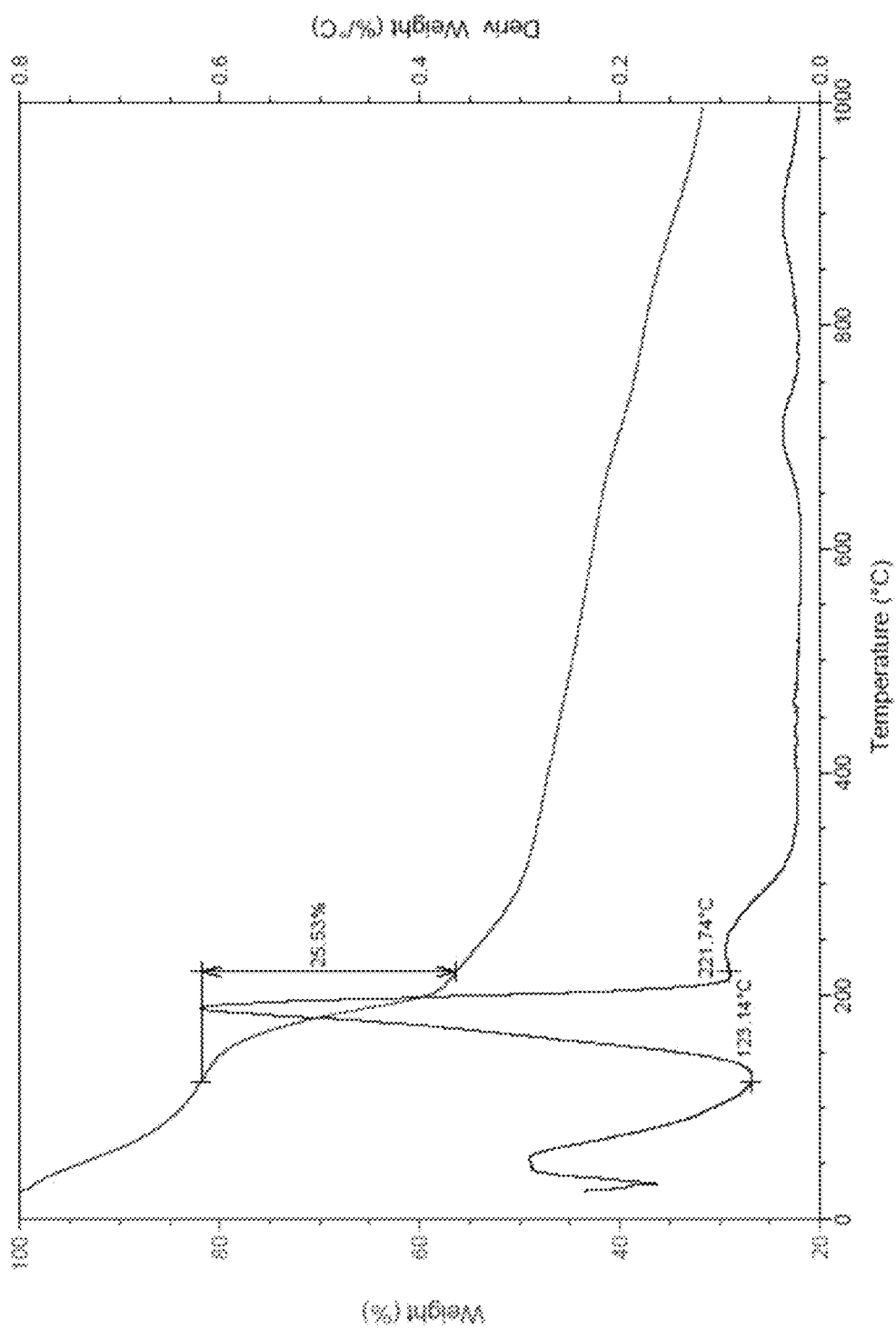
FIG. 2 is a Thermogravimetric Analysis spectrum obtained for a graphene oxide according to an example embodiment of the present invention

Thermogravimetric analysis ("TGA") was carried out on SDT Q600 analyzer equipped with a temperature compensated thermobalance under a high purity $N_2$ purged environment with a gas flow rate of 100 ml/min. The sample was heated from 35° C. to 1000° C. with a rate of 5° C./min. FIG. 2 shows a TGA spectrum obtained for a graphene oxide created according to an embodiment method of the present invention. The TGA spectrum of FIG. 2 shows a significant weight loss between 130° C. to 220° C. This corresponds to the release of CO and $CO_2$ release from the most labile functional groups. The slower weight loss beyond that to 1000° C. can be attributed to the removal of more stable oxygen functionalities.

Fourier Transform Infrared Spectroscopy Characterization

Figure 3:
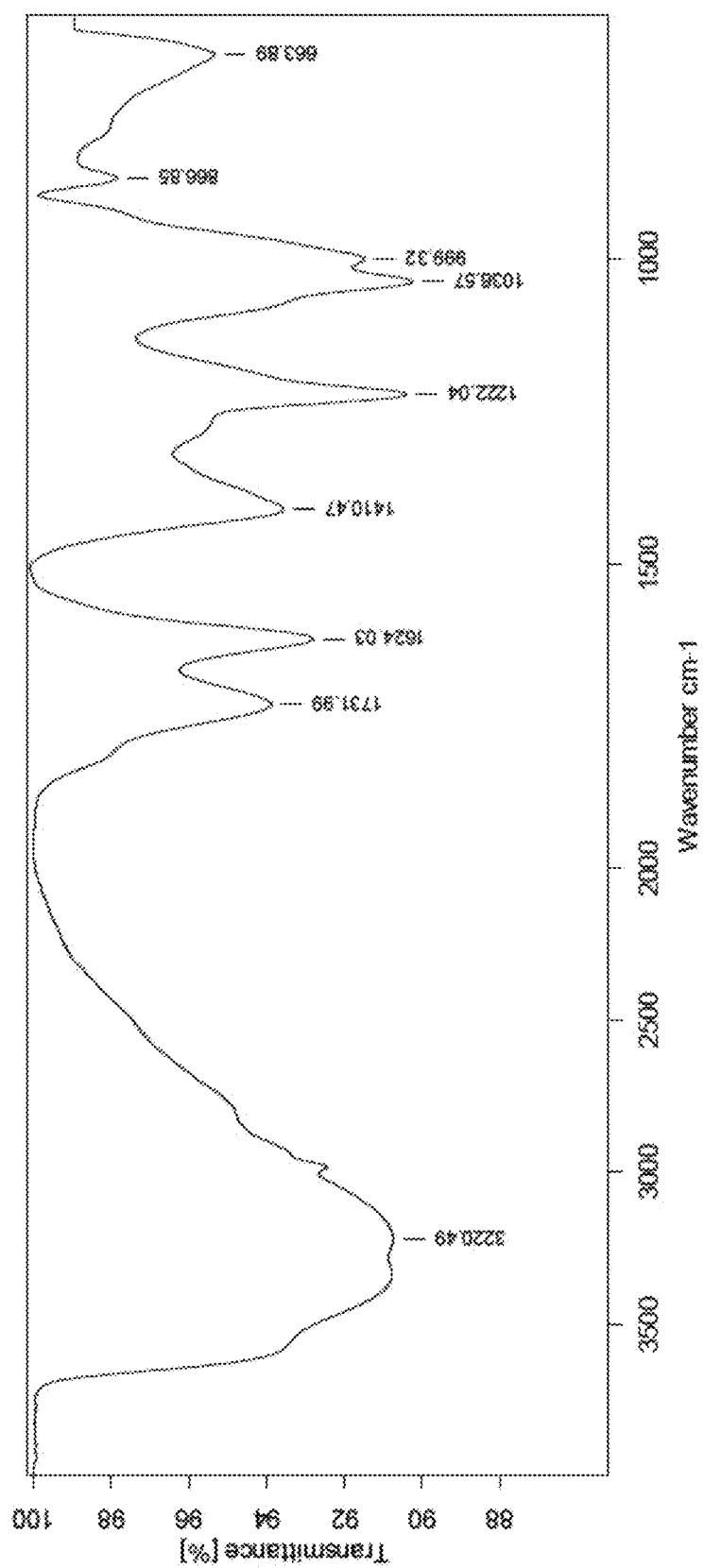
FIG. 3 is a Fourier Transform IR spectrum for a graphene oxide powder according to an example embodiment of the present invention FIG. 4 are Raman spectra for graphene oxide

In order to get a qualitative understanding of the available functional groups,

Fourier Transform Infrared Spectroscopy ("FTIR") measurements were recorded on a Bruker NANCO Vertex 80 FTIR spectrometer equipped with attenuated total reflectance accessory. A representative FTIR spectrum is shown in FIG. 3. The following functional groups were identified. The hydroxyl stretching band (3000-4000 $cm^{-1}$). The peak at 1732 $cm^{-1}$ was assigned as carbonyl C=O double bonds stretching vibration, the sharp and strong absorption at 1624 $cm^{-1}$ assigned as the stretching mode of intercalated water molecules. C=C from unoxidized $sp^2$ CC bonds (1590-1620 $cm^{-1}$), C—O vibrations and C—O—C (-epoxy-) vibration at 1200 $cm^{-1}$ and below. The observed spectral peak positions are in very good agreement with published data on graphene using the method disclosed in Tour.

Raman Spectroscopy

Figure 4:
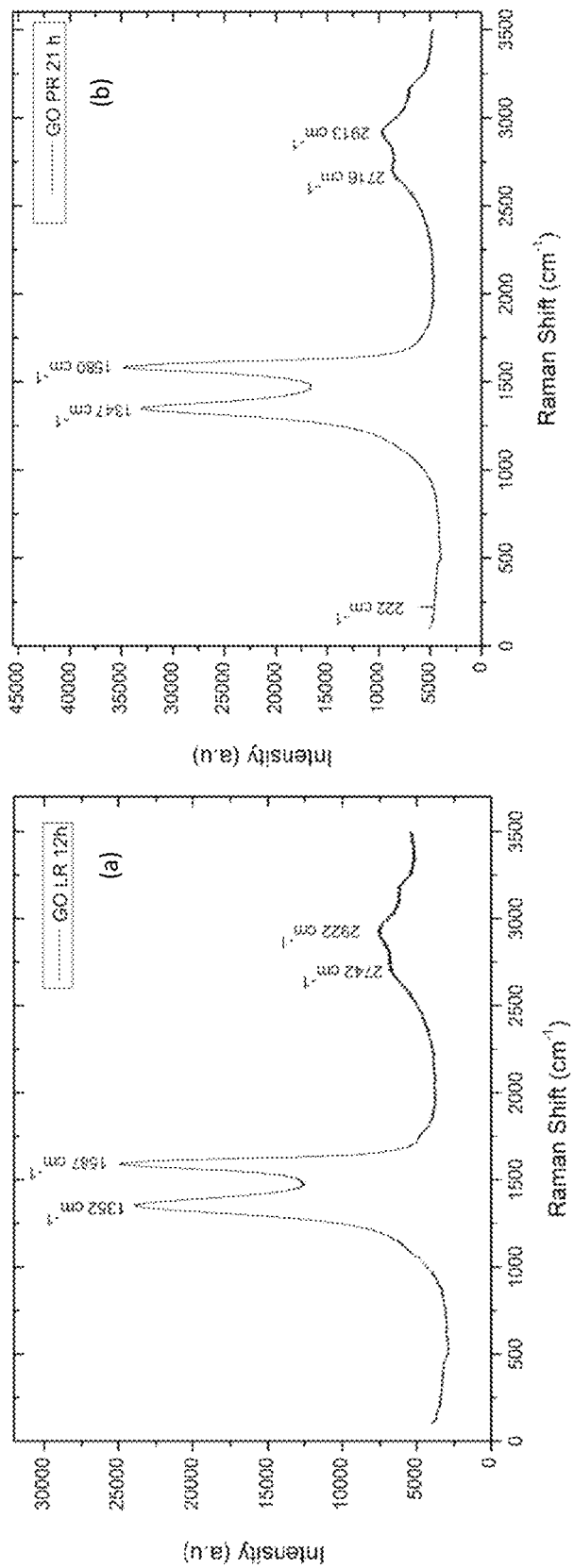

Raman spectroscopy of samples, lab and pilot scale process was performed by a Renishaw InVia Raman Spectrometer using a 514.5 nm wavelength laser. The data were collected with an objective of 50×, scanning the spectrometer from 100 $cm^{-1}$ to 3500 $cm^{-1}$. Raman spectra of the two samples lab process and pilot scale process are shown in FIG. 4 at (a) and (b) respectively. Usually graphene oxide has two prominent peaks called D and G and lesser intense higher order peaks 2D and S3. The G peak corresponds to the E2G phonon at the Brillouin zone centre and is observed at 1580 $cm^{-1}$ for graphite. The G peak of lab processed sample is wider and blue-shifted to 1587 $cm^{-1}$ confirming the higher order oxidation which is similar to the method disclosed in Tour. The D peak, which requires a defect for its activation, arises due to the breathing modes of $sp^2$ rings, is centered at 1352 $cm^{-1}$. However, the G peak position of pilot scale process sample remains at 1580 $cm^{-1}$ and The D peak is centered at 1347 $cm^{-1}$ due to extremely high oxidation which already observed as in XRD. The ratio I(D)/I(G) for these GO derived from other methods is normally around 1 or more, compared to 0.95 for the lab process and 0.94 for pilot scale process. The lower I(D)/I(g) ratio indicates that the relative number of defects in the $sp^2$ bonded graphene structure which arises in the current oxidation method is lower. Inter-defect distance (La) in disordered $sp^2$ carbons is can be calculated from the relation I(D)/I(G)=C'(λ) $La^2$, with C'(514.5 nm)~0.55 $nm^{-2}$. The values of $L_a$ for samples is around 1.3 nm.

Solid State $^{13}C$ Nuclear Magnetic Resonance (NMR) Spectroscopy

Figure 5:
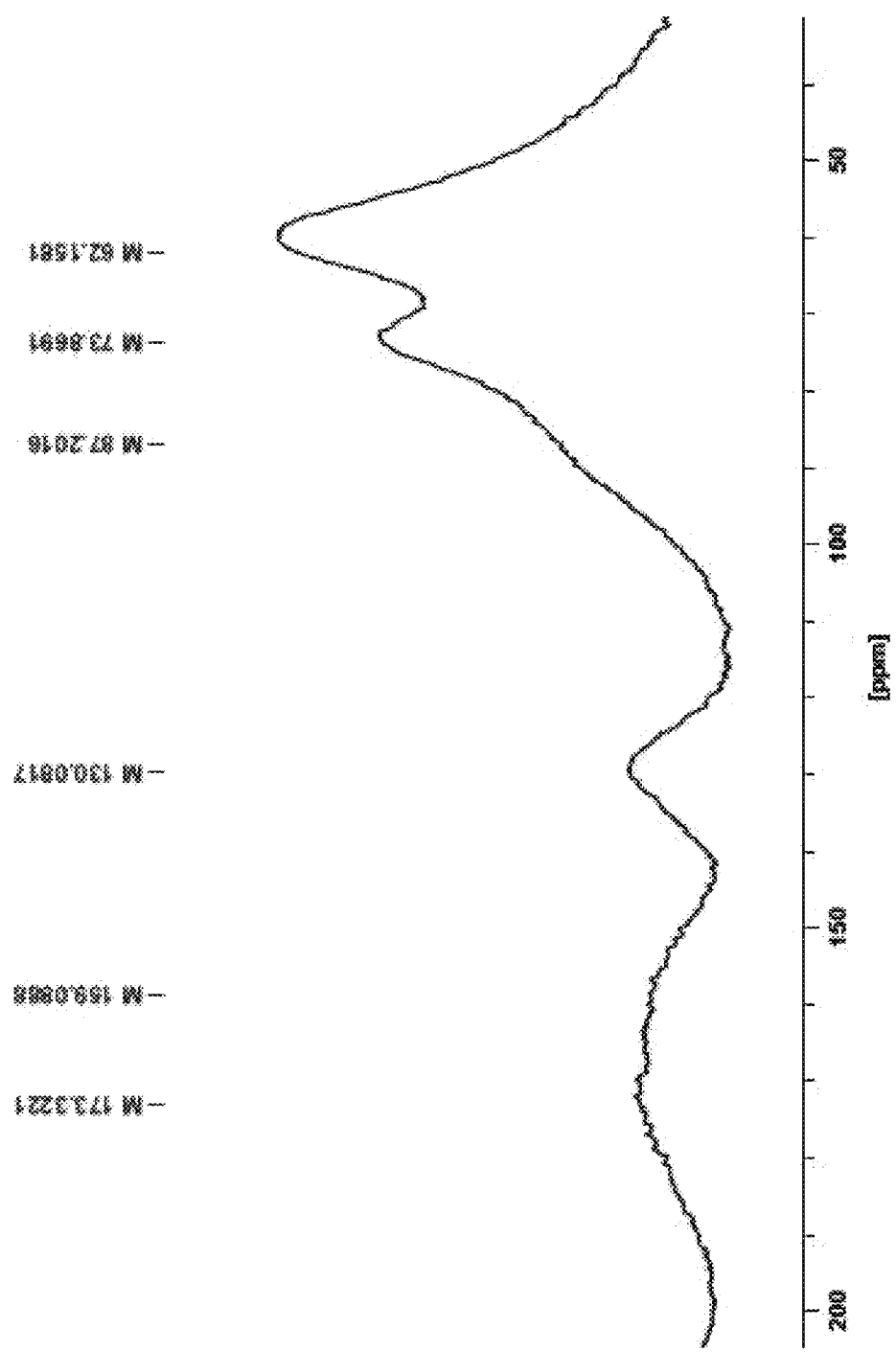
FIG. 5 is a Nuclear Magnetic Resonance (NMR) spectra for graphene oxide

FIG. 5 illustrates solid state direct $^{13}C$ pulse NMR spectra for highly-oxidized graphene oxide. The $^{13}C$ NMR spectra were obtained at 50.3 MHz, with 10 kHz magic angle spinning, a 90° $^{13}C$ pulse, 40 ms FID and 20 second relaxation delay. In the $^{13}C$ NMR spectra, six peaks were observed at 62, 73, 87, 130, 159 and around 173 ppm are assigned to epoxides, alcohols, lactols, graphitic carbons, carboxylates, and ketones respectively. The NMR results also well exhibits the oxidation process and good agreement with the other methods reported.

Atomic Force Microscopy Image

Figure 6:
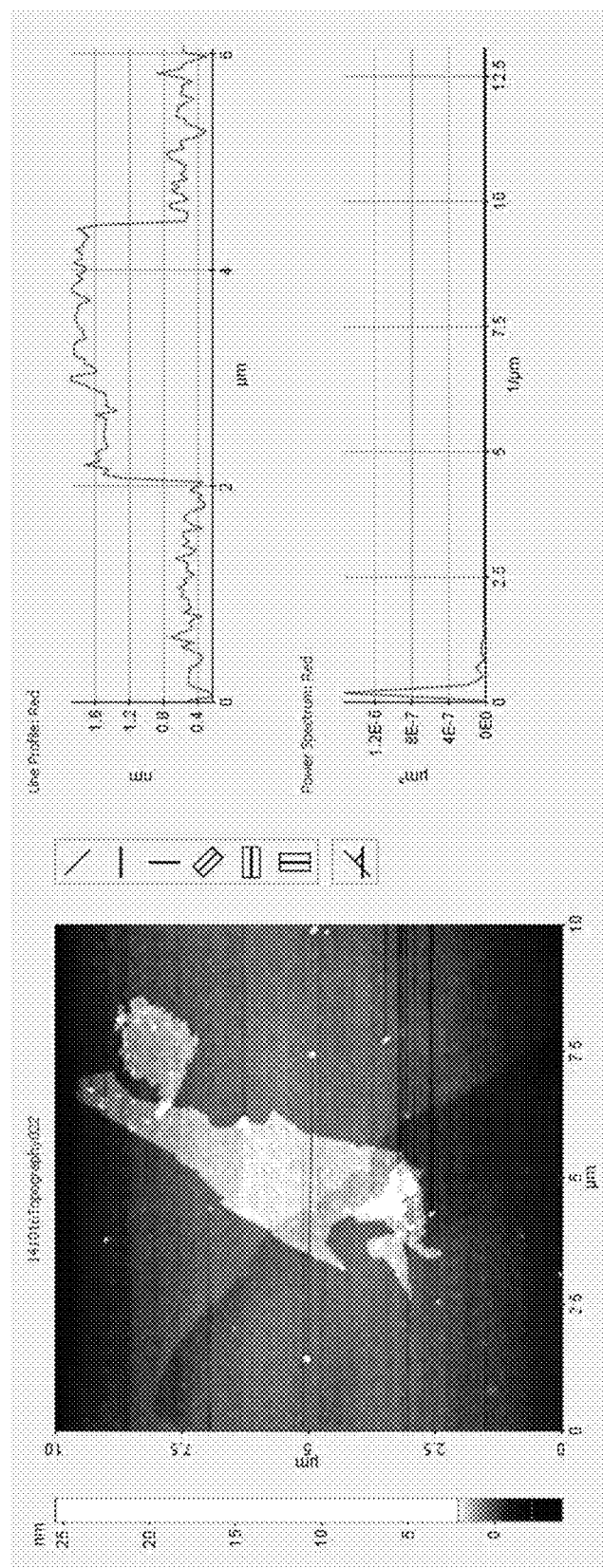
FIG. 6 is an Atomic Force Microscopy image of a graphene oxide flake on a mica substrate

One of the most important aspects of commercial viability of any graphene oxide creation methods is the ability to obtain single to few layer graphene oxide sheets with reasonable lateral dimensions. As described above, graphene oxide created using the method of the present invention was exfoliated and transferred onto a mica substrate for characterization using atomic force microscopy. FIG. 6, shows an atomic force microscopy image ("AFM") that confirms the creation of relatively large (approximately 5 microns×7.5 microns) sheet single to few layers of high quality graphene oxide. The lateral size of this sheet is much larger than the reported values obtained using Hummers's or Tour's methods. Importantly, the AFM image confirms that the graphene oxide sheets created by the methods of the present invention are high quality and, similar to the graphene oxide created by Tour's method, do not contain substantial defects.

Transmission Electron Microscopy and Selected Area Electron Diffraction (SAED)

Figure 7:
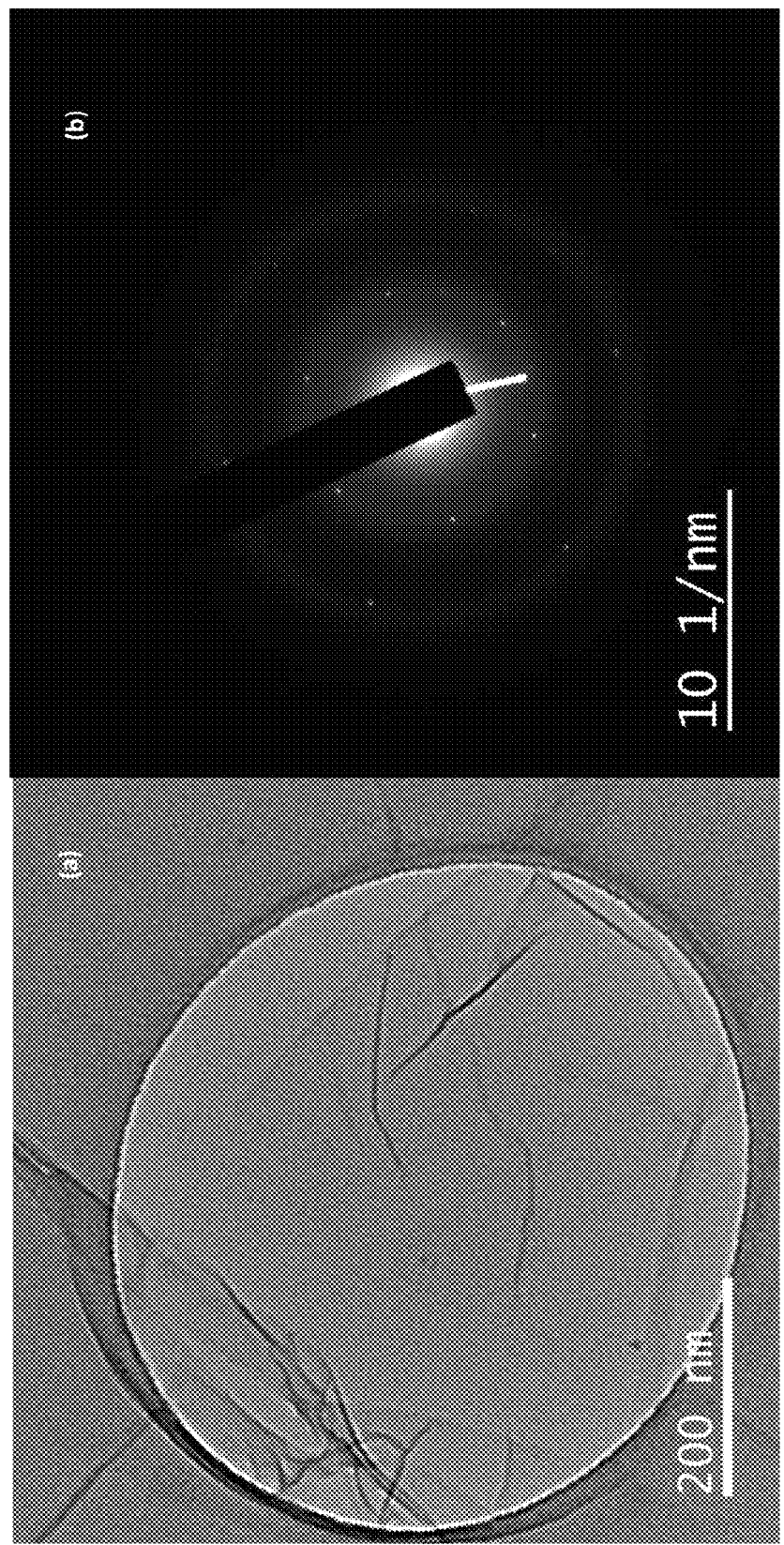
FIG. 7 shows TEM images for graphene oxide obtained on a lacey-carbon TEM grid and SAED pattern

FIG. 7 at (a) shows TEM image for mono/few layer highly-oxidized graphene oxide obtained on a lacey-carbon grid. The corresponding shows Selective Area Electron Diffraction (SAED) patterns for graphene oxide is shown in FIG. 7 at (b). The SAED pattern for graphene oxide prepared by the methods of the present disclosure indicates good crystallinity in the $sp^2$ bonded carbon plane and a more regular large carbon frame work.

Ultra Violet-Visible Light (UV-Vis) Spectroscopy

Figure 8:
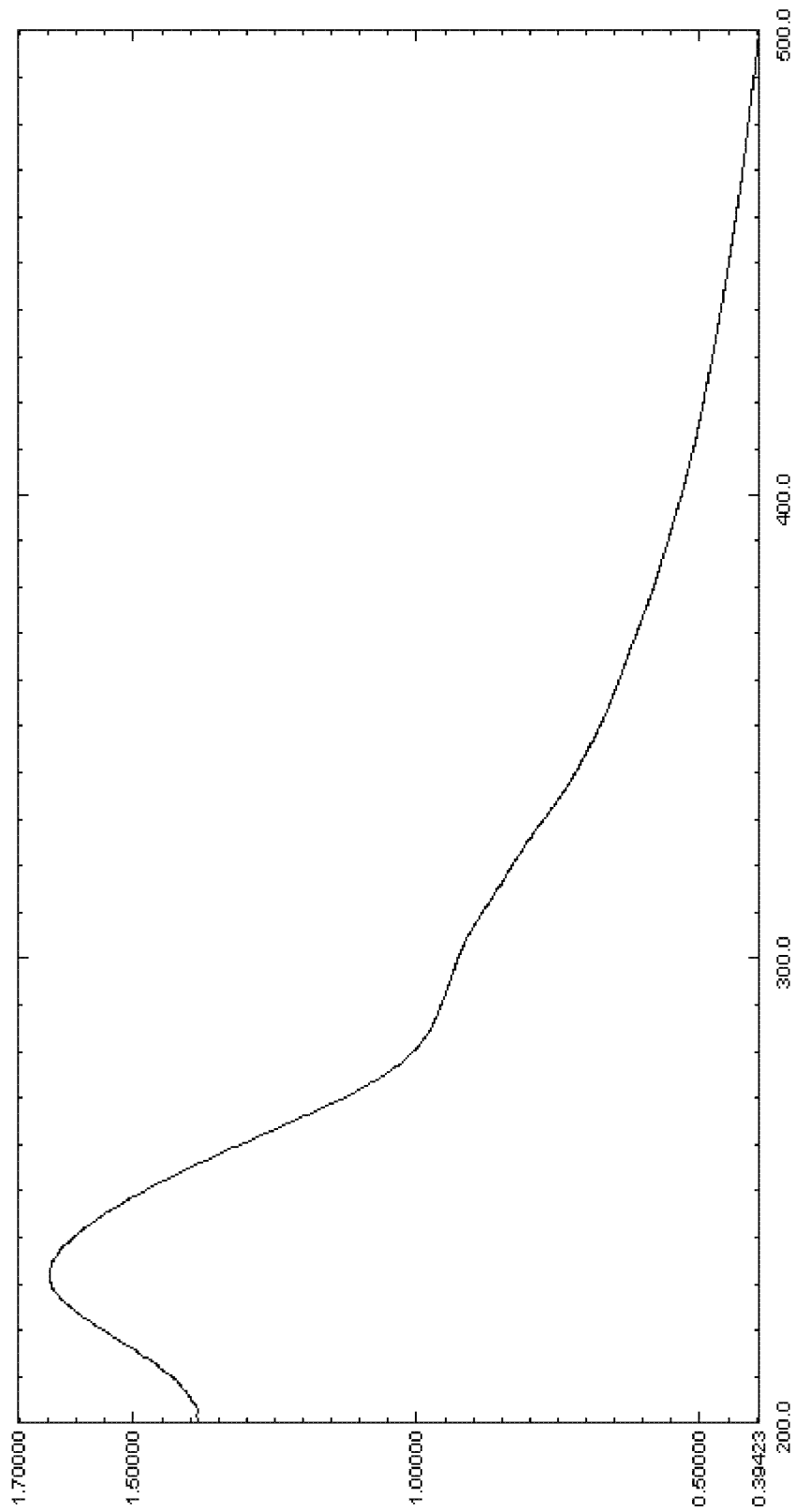
FIG. 8 is an UV/VIS spectrum for highly-oxidized graphene oxide

FIG. 8 shows the UV-Vis absorption spectrum for graphene oxide, at 0.1 mg $ml^{-1}$ concentration. $\lambda_{max}$ value of the present disclosure is 231.6 nm, resulting from π-π* transitions of the aryl rings. This implies the presence of the largest undamaged conjugated graphitic domains within the graphene layers. Additionally, a small shoulder peak at around 300 nm is due to the normalized absorbance of n-π* transitions implying an increase in the relative population of C=O containing functional groups with respect to the $sp^2$-conjugated domains.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method of synthesizing graphene oxide with an X-ray diffraction spectrum having a single dominant peak at a two theta angle below 10 degrees without the use of $H_3PO_4$ or a nitrogen-containing compound comprising:
   a. providing a graphite source;
   b. reacting the graphite source with $H_2SO_4$ in a vessel;
   c. adding $KMnO_4$ to the vessel to form a reaction mixture, wherein the $H_2SO_4$, graphite source, and $KMnO_4$ are maintained at a temperature between 0° C. and 10° C. from the addition of the $H_2SO_4$ through reaction with $KMnO_4$ for a period of more than 8 hours;
   d. adding $H_2O_2$ and $H_2O$ to the reaction mixture in order to create a supernatant and a graphene oxide slurry; and
   e. separating the supernatant in order to obtain the graphene oxide slurry.

2. The method of claim 1 further comprising washing the graphene oxide slurry with one or more washing agents.

3. The method of claim 2 wherein the washing agents comprise a mixture of $H_2O$ and HCl.

4. The method of claim 3 wherein the washing agents further comprise a mixture of ethanol and diethyl ether.

5. The method of claim 2 wherein the graphene oxide slurry is dried at room temperature under vacuum.

6. The method of claim 2 wherein the graphene oxide slurry is exfoliated.

7. The method of claim 6 wherein exfoliation comprises addition of the graphene oxide slurry to an aqueous solution and sonication of the resulting mixture to create a sonicated mixture.

8. The method of claim 7 wherein exfoliation further comprises transfer of the sonicated mixture to a substrate.

9. The method of claim 1 wherein the ratio of graphite source (in grams) to $KMnO_4$ (in grams) is between about 1:2 and about 1:5.

10. The method of claim 9 wherein the graphite source comprises at least 99% graphite.

* * * * *